Oct. 21, 1969  A. WALSH  3,473,940
PREPARATION OF PHOTOELECTROPHORETIC IMAGING SUSPENSION
Filed April 21, 1966
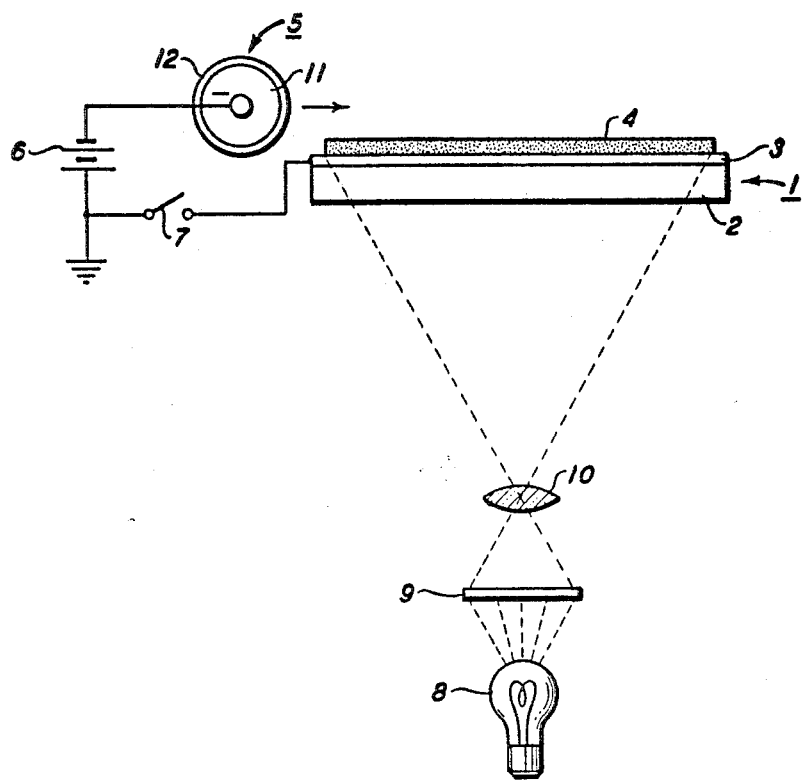
INVENTOR.
ARTHUR WALSH
BY *John R. Duncan*
*James J. Ralabate*
ATTORNEYS United States Patent Office 3,473,940
Patented Oct. 21, 1969

3,473,940
PREPARATION OF PHOTOELECTROPHORETIC
IMAGING SUSPENSION
Arthur Walsh, Webster, N.Y., assignor to Xerox Corporation, Rochester, N.Y., a corporation of New York
Filed Apr. 21, 1966, Ser. No. 544,217
Int. Cl. C09c 1/00, 3/00
U.S. Cl. 106—309                                    6 Claims

ABSTRACT OF THE DISCLOSURE

A three color photoelectrophoretic imaging suspension is prepared by milling two pigments together in a carrier liquid to form a duo mix. A second duo mix having one color common to the first duo mix is prepared and combined with the first duo mix providing a method for avoiding milling the two interacting pigments together. The resulting tri-mix provides higher quality images than tri-mixes prepared by milling the three pigments together or by milling each pigment separately and then combining them in a tri-mix.

This invention relates in general to imaging methods. More specifically, the invention concerns the preparation of photosensitive pigment mixes for use in electrophoretic imaging systems.

There has been recently developed an electrophoretic imaging system capable of producing color images which utilize photoconductive particles. This process is described in detail and claimed in copending applications Ser. Nos. 384,737 now U.S. Patent 3,384,565, 384,681 now abandoned and 384,680 now abandoned, all filed July 23, 1964. In such an imaging system, various colored light absorbing particles are suspended in a non-conductive liquid carrier. The suspension is placed between electrodes, subjected to a potential difference and exposed to an image. As these steps are completed, selective particle migration takes place in image configuration, providing a visible image at one or both of the electrodes. An essential component of the system is the suspended particles which must be intensely colored and electrically photosensitive and which apparently undergo a net change in charge polarity upon exposure to activating radiation, through interaction with one of the electrodes. The images are produced in color because mixtures of two or more differently colored sets of particles which are each sensitive only to light of a specific wavelength or narrow range of wavelengths are used. Particles used in this system must have both intense pure colors and be highly photosensitive.

In a subtractive color system, the pigment mix includes cyan, magenta and yellow particles. In an additive system, the particles are blue, red and green. In order to obtain high image resolution, the pigment particles should be very finely divided. While relatively larger pigment particles are operative, the resulting image has apparent grain. Also, finely divided particles, in general, have higher photographic speed than larger particles. The methods of synthesizing many pigments produce a product by precipitation which results in a relatively coarse powder. Also, commercial pigments are often sold as coarse powders. For optimum results in the above-described process, it is necessary to reduce the pigment particle sizes. Any conventional size reduction method may be used such as ball milling. However, when the three pigments are ball milled together to the desired final size, the images ultimately produced often show undesirable characteristics. For example, a small proportion of magenta particles may undesirably deposit in yellow areas of the image. It is believed that some sort of interaction occurs between particles of different colors resulting in improper transfer of small portions of specific colors. It is thought that something occurs during ball milling to cause this interaction. However, the mechanism of this occurrence is not known, since individual particles of specific pigments appear unchanged after ball milling except for the size reduction.

An attempt was made to overcome this interaction by ball milling each of the three pigments individually and then mixing them immediately before imaging. While some reduction in the apparent interaction occurred many pigments still interacted to the point where the final color balance was degraded.

Thus, there was a continued need for a better method for preparing pigment mixes which would be capable of producing images having clear, pure colors.

It is, therefore, an object of this invention to provide a method of preparing pigment mixes for electrophoretic imaging processes which overcomes the above-noted deficiencies.

It is another object of this invention to provide a method of preparing pigment mixes for electrophoretic imaging processes which eliminates inter-pigment interaction.

It is another object of this invention to provide pigment mixes for electrophoretic imaging which result in images of high quality and correct color balance.

It is still another object of this invention to provide electrophoretic imaging processes capable of producing images having pure, intense colors corresponding to the original.

It is still another object of this invention to provide a process for eliminating pigment-interaction in electrophoretic imaging systems.

The foregoing objects and others are accomplished in accordance with this invention, fundamentally, by providing a method for preparing pigment mixes which prevents interaction between pairs of pigments. This method comprises the steps of mixing one-half of the desired amount of the non-interacting pigment with the desired amounts of each of the other two pigments in two separate "duo-mixes." Each of these duo-mixes is then ball milled until the size of the pigment particles is reduced to the desired fineness. These two duo-mixes are then mixed together, resulting in a dispersion suitable for use in electrophoretic imaging systems. It has been found, surprisingly, that ball milling the pigments in pairs, each pair including the non-offending pigment, results in images of much superior color quality and color balance than does grinding all three pigments together or milling each pigment individually and thereafter mixing the three together. This is especially surprising since, if milling three pigments together causes pigment interaction, one would expect that the problem could be overcome by milling each pigment individually and thereafter mixing the three pigments. It has been found, however, that while this does effect some improvement in color quality, color quality increases much more if the pigments are milled in pairs as discussed above.

Which pairs of pigments are to be milled together must usually be determined emphirically. Three proposed pigments are milled together as a tri-mix and an image is made utilizing said mix. The resulting image is examined and a visual determination is made whether a pair of the pigments have deposited excessively in undesired areas of the image. If this is the case, then the interacting pigments are milled separately in a pair of duo-mixes, each containing part of the non-interacting pigment. It has been found that most often the magenta and yellow pigments interact excessively and that therefore the two duo-mixes comprise a pair of yellow and cyan pigments and a pair of cyan and magenta pigments. Depending upon the compositions of the three pigments used, sometimes undesired interaction does not occur and all three pigments can be milled together to produce a pigment mix giving acceptable results. However, generally image quality can be improved by milling the pigments as duo-mixes and in most cases, the duo-mix system is essential for acceptable color balance.

In general, the particle size of the three pigments should be in the range of 0.1 to 0.7 microns to produce images of good resolution and color qualities. Optimum image resolution and pigment photosensitivity has been found to occur with pigment particle sizes in the 0.2 to 0.4 micron range.

The improvements in color qualities resulting from the preparation of the pigment mixes by the duo-mix milling process will become apparent from the examples and tests given below. These imaging tests were performed in sets of three for each mixture of three pigments. For the first test, the three pigments were ball milled together as a tri-mix. In the second test, in each set, the three pigments were ball milled individually and then mixed together immediately before imaging. In the third test of each set, the pigments were ball milled in duo-mixes, utilizing as the common pigment the non-interacting pigment.

The imaging tests were performed in an apparatus which is schematically portrayed in the figure. Referring now to the figure, there is seen a transparent electrode generally designated 1 which, in this exemplary instance, is made up of a layer of optically transparent glass 2 overcoated with a thin optically transparent layer 3 of tin oxide, commercially available under the name NESA glass. This electrode will hereafter be referred to as the "injecting electrode." Coated on the surface of injecting electrode 1 is a thin layer 4 of finely divided photosensitive particles dispersed in an insulating liquid carrier. The term "photosensitive," for the purposes of this application, refers to the properties of a particle which, once attracted to the injecting electrode, will migrate away from it under the influence of an applied electric field when it is exposed to actinic electro-magnetic radiation. For a detailed theoretical explanation of the apparent mechanism of operation of the invention, see the above mentioned copending applications Ser. Nos. 384,737, 384,361 and 384,680, the disclosures of which are incorporated herein by reference. Liquid suspension 4 may also contain a sensitizer and/or a binder for the pigment particles which is at least partially soluble in the suspending or carrier liquid. Adjacent to the liquid suspension 4 is a second electrode 5, hereinafter called the "blocking electrode," which is connected to one side of the potential source 6 through a switch 7. The opposite side of potential source 6 is connected to the injecting electrode 1 so that when switch 5 is closed, an electric field is applied across the liquid suspension 4 between electrodes 1 and 5. An image projector made up of a light source 8, a transparency 9, and a lens 10 is provided to expose the dispersion 4 to a light image of the original transparency 9 to be reproduced. Electrode 5 is made in the form of a roller having a conductive central core 11 connected to the potential source 6. The core is covered with a layer of a blocking electrode material 12, which may be Baryta paper. The pigment suspension is exposed to the image to be reproduced while a potential is applied across the blocking and injecting electrodes by closing switch 7. Roller 5 is caused to roll across the top surface of injecting electrode 1 with switch 7 closed during the period of image exposure. This light exposure causes exposed pigment particles originally attracted to electrode 1 to migrate through the liquid and adhere to the surface of the blocking electrode, leaving behind a pigment image on the injecting electrode surface which is a duplicate of the original transparency 9. After exposure, the relatively volatile carrier liquid evaporates off, leaving behind the pigment image. This pigment image may then be fixed in place as, for example, by placing a lamination over its top surface or by virtue of a dissolved binder material in the carrier liquid such as paraffin wax or other suitable binder that comes out of solution as the carrier liquid evaporates. About 3% to 6% by weight of paraffin binder in the carrier has been found to produce good results. The carrier liquid itself may be paraffin wax or other suitable binder. In the alternative, the pigment image remaining on the injecting electrode may be transferred to another surface and fixed thereon. This system can produce either monochromatic or polychromatic images depending upon the type and number of pigments suspended in the carrier liquid and the color of light to which this suspension is exposed in the process.

Any suitable insulating liquid may be used as the carrier for the pigment particles in the system. Typical carrier liquids are decane, dodecane, N-tetradecane, paraffin, beeswax or other thermoplastic materials, Sohio Odorless Solvent 3440, (a kerosene fraction) and Isopar-G, (a long chain saturated aliphatic hydrocarbon). Good quality images have been produced with voltages ranging from 300 to 5,000 volts in the apparatus of the figure.

In a polychromatic system, the particles are selected so that those of different colors respond to different wave lengths in the visible spectrum corresponding to their principal absorption bands. Also, the pigments should be selected so that their spectral response curves do not have substantial overlap, thus allowing for color separation and subtractive multicolor image formation. In typical multicolor system, the particle dispersion should include cyan colored particles sensitive mainly to red light, magenta particles sensitive mainly to green light and yellow colored particles sensitive mainly to blue light. When mixed together in a carrier liquid, these particles produce a black appearing liquid. When one or more of the particles are caused to migrate from base electrode 11 toward an upper electrode, they leave behind particles which produce a color equivalent to the color of the impinging light. Thus, for example, red light exposure causes the cyan colored pigment to migrate, leaving behind the magenta and yellow pigments which combine to produce red in the final image. In the same manner, blue and green colors are reproduced by removal of yellow and magenta, respectively. When white light impinges upon the mix, all pigments migrate, leaving behind the color of the white or transparent substrate. No exposure leaves behind all pigments which combine to produce a black image. This is an ideal technique of subtractive color imaging in that the particles are not only each composed of a single component but, in addition they perform the dual functions of final image colorant and photosensitive medium.

Any suitable different colored photosensitive pigment particles having the desired spectral responses may be ued to form a pigment mix in a carrier liquid for color imaging. Typical pigments include: Algol Yellow GC, 1,2,5,6-di(C,C'-diphenythiazole-anthroquinone, C.I. No. 67300; Calcium Litho Red, the Calcium lake of 1-(2'-axonaphthalene-1'-sulfonic acid)-2-naphthol, C.I. No. 15630; Cyan Blue GTNF, the beta form of copper phthalocyanine, C.I. No. 74160; Diane Blue, 3,3'-methoxy-4,4'-diphenyl- bis(1"-azo-2"-hydroxy-3"-naphthanilide, C.I. No. 21180; Duol Carmine, the calcium lake of 1-(4'-methylazobenzene)-2'-sulfonic acid)-2-hydroxy-3-naphthoic acid; Indofast Brilliant Scarlet Toner, 3,4,9,10-bis [N,N'-(p-methoxyphenyl)-imido] perylene, C.I. No. 71140; Indofast Yellow Toner, flavanthrone, C.I. No. 70600; Methyl Violet a phosphotungstomolybdic lake of 4-(N,N',N"-trimethylanilino) methylene-N",N"-dimethylanilinium chloride, C.I. No. 42535; Monolite Fast Blue GS, a mixture of the alpha and beta forms of metal-free phthalocyanine; Naphthol Red B, 1-(2'-methoxy-5'-nitrophenylazo-2-hydroxy-3"-nitro-3-naphthanilide, C.I. No. 12355; Quindo Magenta RV-6803, a substituted quinacridone, Vulcan Fast Red BBE Toner 35–2201, 3,3'-dimethoxy-4,4'-biphenyl - bis(1"-phenyl-3"-methyl-4"-azo-2"-pyrazolin-5"-one), C.I. No. 21200; Watchung Red B, 1-(4'-methyl - 5' - chloroazobenzene-2'-sulfonic acid)-2-hydroxy-3-naphthoic acid, C.I. No. 15865, and pigments prepared as described in copending application Ser. Nos. 421,377, 421,280, 421,281 (each filed Dec. 28, 1964), 445,179, 445,235, now U.S. Patent 3,402,177, and 444,240 (each filed Apr. 2, 1965). From about 2 to about 10 percent pigment by weight have been found to produce good results. The addition of small amounts (generally ranging from 0.5 to 5 mole percent) of electron donors or acceptors to the suspensions may impart significant increases in system photosensitivity.

Any suitable size reduction method may be used to reduce pigment particles from the size as purchased or made to a size suitable for electrophoretic imaging. Typical methods include ball milling, strong sheer agitation, roller milling, sand milling, ultrasonic agitation, high speed blending and any desirable combination of these methods.

The following examples further specifically define the present invention with respect to improvement in electrophoretic imaging processes. Parts and percentages are by weight unless otherwise indicated. The examples below are intended to illustrate various preferred embodiments of the electrophoretic imaging process of this invention.

All of the imaging tests of pigments prepared in the following examples are carried out in an apparatus of the general type illustrated in the figure with the imaging mix 4 coated on a NESA glass substrate through which exposure is made. The NESA glass surface is connected in series with a switch, a potential source, and the conductive center of a roller having a coating of Baryta paper on its surface. The roller is approximately 2½ inches in diameter and is moved across the plate surface at about 4 centimeters per second. The plate employed is roughly 4 inches square and is exposed with a light intensity of 1,500 foot candles as measured on the uncoated NESA glass surface. Unless otherwise indicated, 7 percent by weight of the indicated pigments in each example are suspended in Sohio Odorless Solvent 3440 and the magnitude of the applied potential is 3000 volts.

In each case, the particle suspension is exposed to a polychromatic image through a conventional "Kodachrome" transparency. The quality of the resulting image is graded for color density and balance on an arbitrary 0 through 10 scale. A ranking of 1–4 indicates unacceptable color or lack of good color separation, a ranking of 5–7 indicates fair color separation and fidelity, and a ranking of 8–10 indicates image of good to excellent color balance and density substantially conforming to the original. The quality of the images produced in each of the following examples is tabulated in Table I for easy comparison.

EXAMPLE I(a)

About one part of Watchung Red, 1-(4'-methyl-5'-chloroazobenzene-2'-sulfonic acid)-2-hydroxy-3-naphthoic acid, C.I. No. 15865; about 3 parts Monolite Fast Blue GS, a mixture of alpha and beta forms of metal-free phthalocyanine; and about 2 parts N-2''-pyridyl-8,13-dioxodinaphtho-(2,1-b',2',3'-d)-furan-6-carboxamide, prepared as described in copending application Ser. No. 421,281, filed Dec. 28, 1964 are placed in a glass ball mill jar. About 12 parts Sohio Odorless Solvent 3440 is added to the jar for each part of pigment. The jar is then about half-filled with porcelain balls. The jar containing this tri-mix is then rotated at about 100 r.p.m.'s. for about 48 hours. The injecting electrode is coated with this dispersion and an image is formed as described above. The image produced has poor color fidelity and fair color balance, and is rated at 5. There appears to be interaction between the magneta and yellow pigments with excessive magneta depositing in yellow areas of the image.

EXAMPLE I(b)

Since interaction appears to be between magenta and yellow pigments here, duo-mixes are prepared in which the magenta and yellow pigments are not milled together. The first duo-mix comprises about one part Watchung Red B and about two parts Monolite Fast Blue GS. The second duo-mix comprises about one part Monolite Fast Blue GS and about two parts of the yellow pigment of Example I(a). Each of these duo-mixes is placed in a ball mill jar with Sohio Odorless Solvent 3440 and milled as in Example I(a). After milling, the two dispersions are mixed. This dispersion is then imaged as described above. The image produced is of excellent quality with excellent color balance and color separation. The yellow areas show very little undesired magenta deposition. This image is given a rating of 9.

EXAMPLE I(c)

Similar portions of each of the pigments of Example I(a) are placed in individual ball mill jars with about 12 parts Sohio Odorless Solvent 3440 for each part of pigment and milled separately. After milling, the three pigment dispersions are mixed. This dispersion, using the three uni-mixes, is imaged as described above. The image produced is better than that of Example I(a) but poorer than that of Example I(b). Fair color balance and color separation is attained but there is excessive deposition of the magenta in yellow areas of the image. This image is rated at 7.

EXAMPLE II(a)

About one part of a magenta pigment, Watchung Red B; about three parts of a cyan pigment, Monolite Fast Blue GS; and about two parts of a yellow pigment N-2''-(1'',3''-diazyl) - 8,13 - dioxodinaphtho - (2,1-b',2',3'-d)-furan-6-carboxamide, prepared as described in copending application Ser. No. 421,281, filed Dec. 28, 1964, are placed in a glass ball mill jar with about 12 parts Sohio Odorless Solvent 3440 for each part of pigment. The jar is then filled about half full with porcelain balls. The jar is then rotated at about 100 r.p.m.'s. for about 48 hours. An image is formed from this dispersion as described above. The image produced is of fair to poor quality, with some color separation but poor color fidelity. Excessive deposition of magenta pigments in yellow areas indicated undesired interaction between the magenta and yellow pigments. This image is rated at 5.

EXAMPLE II(b)

Since interaction appears to be present between the magenta and yellow pigments, two duo-mixes are prepared to eliminate milling of the magenta and yellow pigments together. The first duo-mix comprises about one part Watchung Red B and about two parts Monolite Fast Blue GS. The second duo-mix comprises about one part Monolite Fast Blue GS and about two parts of the yellow pigment described in Example II(a). Each of these duo-mixes is placed in an individual ball mill jar and is milled in Sohio Odorless Solvent 3440 as in Example II(a). After milling, the two duo-mixes are mixed together as described above. The image produced is of excellent quality with good color balance. No interaction is apparent between the magenta and yellow pigment. This image is rated at 9.

EXAMPLE II(c)

Each of the pigments of Example II(a) is milled in an individual ball mill jar as described in Example II(a). After milling, the three uni-mixes are mixed together and an image is formed from the dispersion as described above. The resulting image is slightly better than that produced in Example II(a) but significantly poorer than that produced in Example II(b). While color fidelity is fair, there is substantial interaction between yellow and magenta areas of the image.

EXAMPLE III(a)

A tri-mix is prepared comprising about 7 parts of a magenta pigment, Bonadur Red B, the calcium lake of 1-(4'-ethyl-5'-chloroazobenzene-2'-sulfonic acid) - 2 - hydroxy-3-naphthoic acid; about two parts of a cyan pigment, Monolite Fast Blue GS, and about one part of a yellow pigment, N-2''-pyridyl-8,13-dioxodinaphtho-(2,1-b',2',3-d)-furan-6-carboxamide. About 20 parts of this tri-mix is placed in a glass ball mill jar with about 250 parts Isopar-G, a mixture of long chain saturated hydrocarbons, the jar is half filled with procelain balls and the jar is rotated at about 100 r.p.m.'s. for about 48 hours. An image is formed from this dispersion as described above. The image produced is of fair quality but with substantial deposition of magenta pigment in yellow image areas. This indicates undesired interaction between magenta and yellow pigments. This image is rated at 6.

EXAMPLE III(b)

Since the magenta and yellow pigments appear to interact, two duo-mixes are prepared so that the magenta and yellow pigments will not be milled together. The first duo-mix comprises about 7 parts Bonadur Red B and about one part Monolite Fast Blue GS. The second duo-mix comprises about one part Monolite Fast Blue GS and about one part of the yellow pigment of Example III(a). Each of these duo-mixes is ball milled in Isopar G, as described in Example III(a). After milling, the two duo-mixes are mixed together. An image is formed from this dispersion as described above. The resulting image is of excellent quality with excellent color separation and color fidelity. No interaction between the magenta and yellow pigments is observed. This image is rated at 10.

EXAMPLE III(c)

Each of the pigments of Example III(a) is individually milled as described in Example III(a). This dispersion is imaged as described above. The image is very similar to that produced in Example III(a) and much inferior to that produced in Example III(b). Very noticeable interaction between the magenta and yellow pigments is observed. This image is rated at 6.

EXAMPLE IV(a)

A tri-mix is prepared by mixing equal parts of a magenta pigment, 2,9 - dibenzoyl - 6,13 - dichloro-benzene, a cyan pigment, Monolite Fast Blue GS, and a yellow pigment, N - 2'-(1'',3''-diazyl)-8,13-dioxodinaphtho-1(2,1-b; 2',2-d)-furan-6-carboxamide, prepared as described in copending application 421,281, filed Dec. 28, 1964. About 20 parts of this tri-mix is placed in a glass ball mill jar with about 250 parts of Sohio Odorless Solvent 3440, the jar is half-filled with porcelain balls, and the jar is rotated at about 100 r.p.m. for about 48 hours. An image is then formed from this dispersion as described above. The image produced is of poor quality with low color fidelity and poor color separation. There appears to be substantial deposition of magenta pigment in yellow areas. Thus, excessive interaction between the magenta and yellow pigments is indicated. This image is rated at 4.

EXAMPLE IV(b)

Since interaction between magenta and yellow pigments is indicated in Example IV(a), two duo-mixes are prepared so that the magenta and yellow will not be milled together. The first duo-mix consists of about 20 parts of the magenta described in Example IV(a) and about 10 parts Monolite Fast Blue GS. The second duo-mix consists of about 10 parts Monolite Fast Blue GS, and about 20 parts of the yellow pigment described in Example IV. Each of these duo-mixes is individually ball milled in Sohio Odorless Solvent 3440, as described in Example IV(a). After milling, these duo-mixes are mixed together, and an image is formed from the dispersion as described above. The image produced is of good quality with good density and good color separation. Very little deposition of magenta pigment in yellow areas is observed. This image is rated at 8.

EXAMPLE IV(c)

Each of the pigments described in Example IV(a) is individually milled as described in Example IV(a). After milling, the three uni-mixes are mixed together and an image is formed from the dispersion as described above. An image of fair to good quality results. The image is better than that produced in Example IV(a) but poorer than that produced in Example IV(b). Some interaction between the magenta and yellow pigments is observed. This image is rated at 6.

EXAMPLE V(a)

A tri-mix is prepared by mixing equal parts of a magenta pigment, Graphthol Rhodamine, the molybdenum lake of 3,6 - bis(diethylamino)9 - ,2' - carbethoxy phenyl xanthenonium chloride; a cyan pigment, Monolite Fast Blue GS; and a yellow pigment, N-2''-(1'',3''-diazyl)-8, 13-dioxodinaphtho-(2,1-b;2',3'-d) - furan-6-carboxamide. About 20 parts of this tri-mix is placed in a glass ball mill jar with about 200 parts Isopar G, the jar is half filled with porcelain balls, and the jar is rotated at about 100 r.p.m. for about 48 hours. An image is then formed from this dispersion as described above. The image produced is of low quality with poor color balance. There appears to be substantial deposition of magenta pigment in yellow areas. Thus, excessive interaction between the magenta and yellow pigments is indicated. This image is rated at 4.

EXAMPLE V(b)

Since interaction between magenta and yellow pigments is indicated in Example V(a), two duo-mixes are prepared so that the magenta and yellow pigments will not be milled together. The first duo-mix comprises about 20 parts of Graphthol Rhodamine and about 10 parts Monolite Fast Blue GS. The second duo-mix consists of about 10 parts Monolite Fast Blue GS and about 20 parts of the yellow pigment described in Example V(a). Each of these duo-mixes is individually ball milled as described in Example V(a). After milling, the two duo-mixes are combined and an image is formed from the dispersion as described above. The image produced is of good quality with good color balance. This image is rated at 8.

EXAMPLE V(c)

Each of the pigments described in Example V(a) is individually milled as described in Example V(a). After milling, the three uni-mixes are combined and an image is formed from the dispersion as described above. An image of fair to good quality results with some deposition of magenta pigment in yellow image areas. While the image is better than that produced in Example V(a), it is poorer than that produced in Example V(b). This image is rated at 6.

TABLE I

| Example: | Milling Mode | | |
|---|---|---|---|
| | Tri-mix | Duo-mix | Uni-mix |
| I | 5 | 9 | 7 |
| II | 5 | 9 | 6 |
| III | 6 | 10 | 6 |
| IV | 4 | 8 | 6 |
| V | 4 | 8 | 6 |

As shown by the above table, the quality of images produced with interacting pigments is consistently higher where the pigments are milled in the duo-mix mode.

Although specific components and proportions have been described in the above examples relating to electrophoretic imaging systems, other suitable materials, as listed above, may be used with similar results. In addition, other materials may be added to the pigment compositions to synergize, enhance, or otherwise modify their properties.

Other modifications and ramifications of the present invention will occur to those skilled in the art upon a reading of the present disclosure. These are intended to be included within the scope of this invention.

What is claimed is:

1. A method of reducing pigment interaction in polychromatic imaging suspensions which comprises preparing said suspension by independently milling each of a plurality of interacting pigments as a pair with a non-interacting pigment in a carrier liquid, then mixing the milled pairs together with their carrier liquids to form said polychromates suspension.

2. The method of claim 1 wherein said pigments comprise a non-interacting cyan pigment, a magenta interacting pigment and a yellow interacting pigment.

3. The method of claim 2 wherein said cyan pigment comprises metal-free phthalocyanine, said magenta pigment comprises 1 - (4' - methyl - 5' - chloroazobenzene-2'-sulfonic acid)-2-hydroxy-3-naphthoic acid and said yellow pigment comprises N-2'''-pyridyl-8,13-dioxodinaphtho-(2,1-b; 2',3'-d)-furan-6-carboxamide.

4. The method of claim 3 wherein said yellow pigment comprises N - 2'' - (1'',3'' - diazyl) - 8,13 - dioxodinaphtho)-2,1-b;2',3'-d)-furan-6-carboxamide.

5. The method of claim 3 wherein said magenta pigment comprises the calcium lake of 1-(4'-ethyl-5'-chloroazobenzene-2'-sulfonic acid)-2-hydroxy-3-naphthoic acid.

6. The method of claim 3 wherein said magenta pigment comprises 2,9-dibenzoyl-6,13-dichloro benzene.

References Cited

UNITED STATES PATENTS

| 2,134,897 | 11/1938 | Theiner | 241—101.8 |
| 2,212,629 | 8/1940 | Alessandroni | 106—309 |
| 2,361,059 | 10/1944 | Robertson | 241—1 |
| 3,332,631 | 7/1967 | Wood | 241—26 |
| 3,384,565 | 5/1968 | Tulagin et al. | 204—181 |
| 3,384,566 | 5/1968 | Clark | 204—181 |

FOREIGN PATENTS 471,829   9/1937   Great Britain.

JOHN H. MACK, Primary Examiner

E. ZAGARELLA, Jr., Assistant Examiner

U.S. Cl. X.R.

96—1.5; 106—288; 204—181; 241—14